(12) United States Patent
Sendra Diaz et al.

(10) Patent No.: US 12,470,625 B2
(45) Date of Patent: Nov. 11, 2025

(54) CELLULAR TELECOMMUNICATIONS NETWORK

(71) Applicant: BRITISH TELECOMMUNICATIONS PUBLIC LIMITED COMPANY, London (GB)

(72) Inventors: Salvador Sendra Diaz, London (GB); Farhad Mehran, London (GB)

(73) Assignee: British Telecommunications Public Limited Company, London (GB)

( * ) Notice: Subject to any disclaimer, the term of this patent is extended or adjusted under 35 U.S.C. 154(b) by 380 days.

(21) Appl. No.: 17/309,768

(22) PCT Filed: Nov. 20, 2019

(86) PCT No.: PCT/EP2019/081927
§ 371 (c)(1),
(2) Date: Jun. 17, 2021

(87) PCT Pub. No.: WO2020/126271
PCT Pub. Date: Jun. 25, 2020

(65) Prior Publication Data
US 2022/0060444 A1 Feb. 24, 2022

(30) Foreign Application Priority Data
Dec. 20, 2018 (EP) .................................. 18214864

(51) Int. Cl.
*H04L 67/1097* (2022.01)
*H04L 12/18* (2006.01)
(Continued)

(52) U.S. Cl.
CPC .......... *H04L 67/1097* (2013.01); *H04L 12/18* (2013.01); *H04W 4/50* (2018.02); *H04W 72/30* (2023.01); *H04L 2101/654* (2022.05)

(58) Field of Classification Search
None
See application file for complete search history.

(56) References Cited

U.S. PATENT DOCUMENTS 9,876,854 B2   1/2018   Serban et al.
9,967,734 B1   5/2018   Bertz et al.
(Continued)

FOREIGN PATENT DOCUMENTS

EP          2745614 B1     3/2018
KR       20180110565 A    10/2018
(Continued)

OTHER PUBLICATIONS

3GPP TR 22.891 V14.2.0 (Sep. 2016), "Technical Specification Group Services and System Aspects; Feasibility Study on New Services and Markets Technology Enablers," 3rd Generation Partnership Project, Technical Report, Mobile Competence Centre, 650, Route Des Lucioles, F-06921 Sophia-Antipolis Cedex, France, XP051295354, Stage 1 (Release 14), Sep. 30, 2016, 95 pages.
(Continued)

*Primary Examiner* — Tonia L Dollinger
(74) *Attorney, Agent, or Firm* — EIP US LLP

(57) ABSTRACT

This disclosure provides a method in a cellular telecommunications network, and a network node for performing the method, the cellular telecommunications network including a content store, and a User Equipment (UE) wherein the UE is identifiable in the cellular telecommunications network by an identifier having a form defined by a cellular telecommunications protocol, the method including receiving a content transaction request from an external node over a wireless connection, the content transaction request including a content store identifier for identifying the content store and further including a content identifier for identifying a content item, wherein the content store identifier has the form defined by the cellular telecommunications protocol
(Continued)

for identifying the UE; and processing the content transaction request to perform a transaction with the identified content item in the identified content store.

15 Claims, 7 Drawing Sheets

(51) Int. Cl.
*H04L 101/654* (2022.01)
*H04W 4/50* (2018.01)
*H04W 72/30* (2023.01)

(56) References Cited

U.S. PATENT DOCUMENTS

| | | | |
|---|---|---|---|
| 2009/0168752 A1* | 7/2009 | Segel | H04N 21/24 370/351 |
| 2013/0219005 A1* | 8/2013 | Kotecha | G06F 16/9574 709/212 |
| 2016/0191664 A1 | 6/2016 | Balakrishnan et al. | |

FOREIGN PATENT DOCUMENTS

| | | |
|---|---|---|
| WO | WO-2012061993 A1 | 5/2012 |
| WO | WO-2016053655 A1 | 4/2016 |
| WO | WO-2016201690 A1 | 12/2016 |
| WO | WO-2017177449 A1 | 10/2017 |

OTHER PUBLICATIONS

3GPP TR 38.874 V0.4.0 (Aug. 2018), "Technical Specification Group Radio Access Network; Study on Integrated Access and Backhaul," 3rd Generation Partnership Project, Technical Report, 650, Route Des Lucioles, Sophia-Antipolis, France, Release 15, Aug. 24, 2018, 58 pages.

Combined Search and Examination Report under Sections 17&18(3) for Application No. GB1820876.9, mailed on Apr. 18, 2019, 6 pages.

Extended European Search Report for Application No. 18214864.3, mailed on Mar. 21, 2019, 10 pages.

International Search Report and Written Opinion for Application No. PCT/EP2019/081927, mailed on Jan. 15, 2020, 16 pages.

Jin H., et al., "Information-Centric Mobile Caching Network Frameworks and Caching Optimization: A Survey," EURASIP Journal on Wireless Communications and Networking, 2017, vol. 2017 (33), 32 pages.

Li F., et al., "Caching Efficiency Enhancement at Wireless Edges with Concerns on Users Quality of Experience," Hindawi, Wireless Communications and Mobile Computing, Research Article, Jan. 30, 2018, vol. 2018, Article ID 1680641, 11 pages, Retrieved from the internet: [URL: https://www.hindawi.com/journals/wcmc/2018/1680641/].

International Preliminary Report on Patentability for Application No. PCT/EP2019/081927, mailed on Jul. 1, 2021, 9 pages.

"Communication pursuant to Article 94(3) EPC for European Application No. 19802220.4, mailed on Feb. 14, 2023".

"Communication pursuant to Article 94(3) EPC for European Application No. 19802220.4, mailed on Jun. 13, 2023".

* cited by examiner ns network of FIG. 2.

CELLULAR TELECOMMUNICATIONS NETWORK

PRIORITY CLAIM

The present application is a National Phase entry of PCT Application No. PCT/EP2019/081927, filed Nov. 20, 2019, which claims priority from EP Patent Application No. 18214864.3, filed Dec. 20, 2018, each of which is hereby fully incorporated herein by reference.

TECHNICAL FIELD

The present disclosure relates to a cellular telecommunications network. In particular, this disclosure relates to a cellular telecommunications network having a Content Delivery Network (CDN).

BACKGROUND

A Content Delivery Network (CDN) is a network of servers and data centers that are utilized to distribute content to a number of users via a content delivery protocol. Content delivery protocols are typically optimized according to some performance parameters, such as high data throughput and/or minimal latency, which may involve storing particular content on CDN servers in a particular location. In conventional cellular telecommunications networks, CDNs are typically deployed in the core network using wired technology (e.g. optical fiber). However, in future cellular networks, it is expected that CDNs will be deployed in the access network, for example on small cell base stations or on relays. This highly distributed architecture of CDNs allows network operators to employ improved content delivery protocols in which content may be stored closer to the end user, thus improving customer experience by minimizing latency, reducing congestion, and providing more reliable connections.

Future cellular networks are also expected to utilize mobile access nodes in which the backhaul connection (for example, from a small cell base station to the core network or from a relay node to a donor base station) is at least partially wireless. However, a problem arises when a CDN is deployed on a mobile access node having a wireless backhaul connection. That is, there is no standardized protocol for wireless communications between CDNs and other nodes in cellular telecommunication networks. Accordingly, wireless CDNs have to use dedicated radio links having proprietary IP-based protocols. This is undesirable and it is an aim of the present disclosure to alleviate these problems.

SUMMARY

According to a first aspect of the disclosure, there is provided a method of operating a network node in a cellular telecommunications network, the cellular telecommunications network including a content store, and a User Equipment (UE) wherein the UE is identifiable in the cellular telecommunications network by a permanent identifier having a form defined by a cellular telecommunications protocol, the method comprising: receiving, at the network node, a content transaction request from another node in the cellular telecommunications network over a wireless connection, the content transaction request including a content store identifier for identifying the content store and further including a content identifier for identifying a content item, wherein the content store identifier has the form defined by the cellular telecommunications protocol for permanently identifying the UE; and processing, at the network node, the content transaction request to perform a transaction with the identified content item in the identified content store.

The cellular telecommunications protocol may be a $3^{rd}$ Generation Partnership Project, 3GPP, protocol, and the identifier may be an International Mobile Subscriber Identifier (IMSI).

The content transaction request from the external node may be to store the content item, and performing the transaction with the content store may include storing the content item in the content store together with the content identifier.

The content transaction request may be of a multicast/broadcast message.

The content transaction request from the external node may be to retrieve the content item, and performing the transaction with the content store may include: identifying the content item based on the content identifier; and retrieving the content item from the content store.

According to a second aspect of the disclosure, there is provided a computer program product comprising instructions which, when the program is executed by a computer, cause the computer to carry out the method of the first aspect of the disclosure. The computer program may be stored on a computer-readable data carrier.

According to a third aspect of the disclosure, there is provided a network node in a cellular telecommunications network, wherein the cellular telecommunications network further comprises a UE, wherein the UE is identifiable in the cellular telecommunications network by a permanent identifier having a form defined by a cellular telecommunications protocol, the network node comprising: a content store; a transceiver configured to receive a content transaction request from another node in the cellular telecommunications network over a wireless connection, the content transaction request including a content store identifier for identifying the content store and further including a content identifier for identifying a content item, wherein the content store identifier has the form defined by the cellular telecommunications protocol for permanently identifying the UE; and a processor configured to process the content transaction request to perform a transaction with the identified content item in the identified content store.

The network node may be one of a group comprising: a relay node, and a small cell base station.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
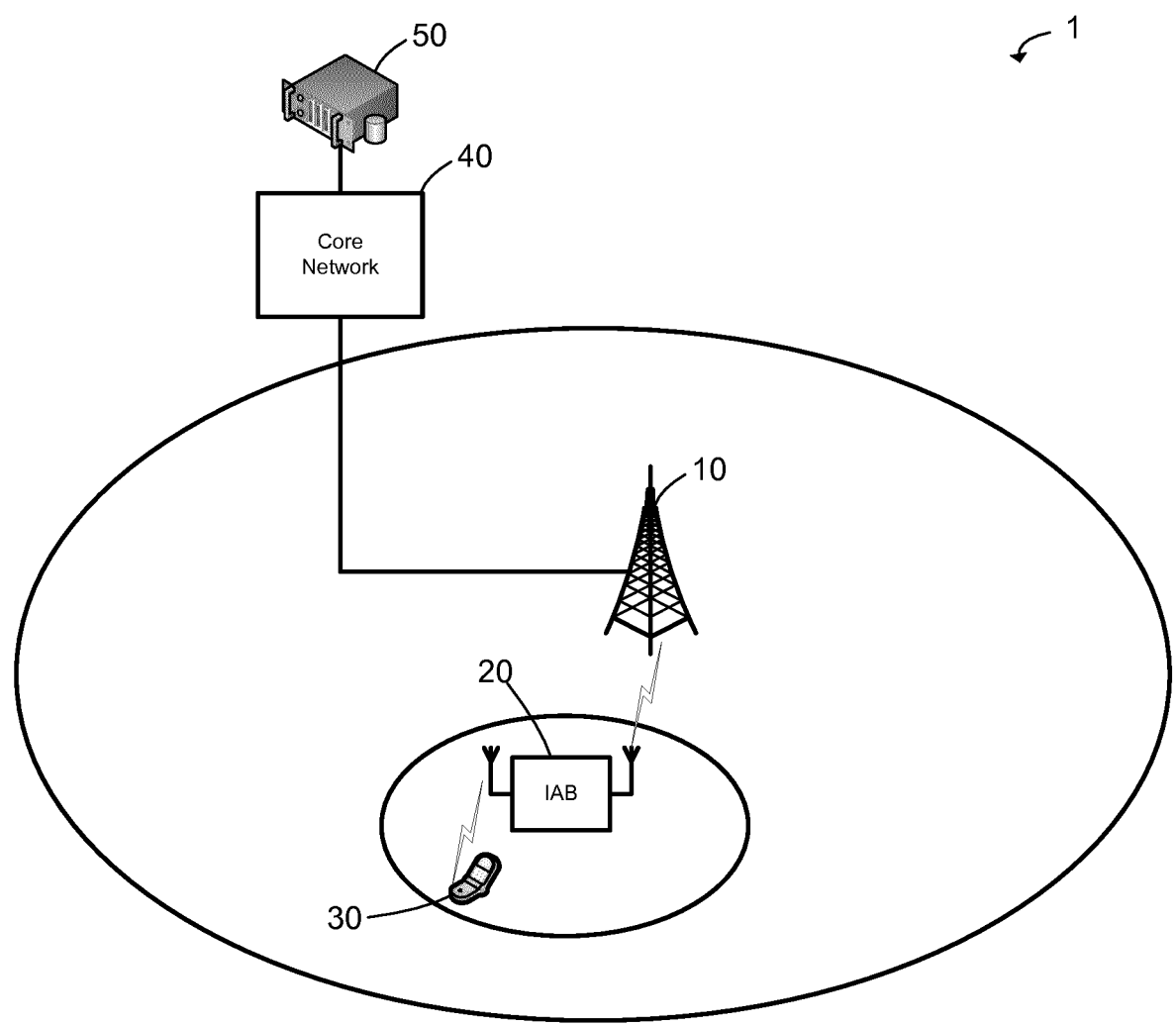
FIG. 1 is a schematic diagram of a cellular telecommunications network of an embodiment of the present disclosure.

A first embodiment of a cellular telecommunications network 1 will now be described with reference to FIGS. 1 to 4. As shown in FIG. 1, the cellular telecommunications network 1 includes a base station 10, a relay node 20, a User Equipment (UE) 30, a core network 40, and a core Content Delivery Network (CDN) server 50. The base station 10, core network 40 and core CDN server 50 are connected via respective wired links (e.g. optical fiber), whilst the base station 10, relay node 20 and UE 30 are connected via respective wireless links.

Figure 2:
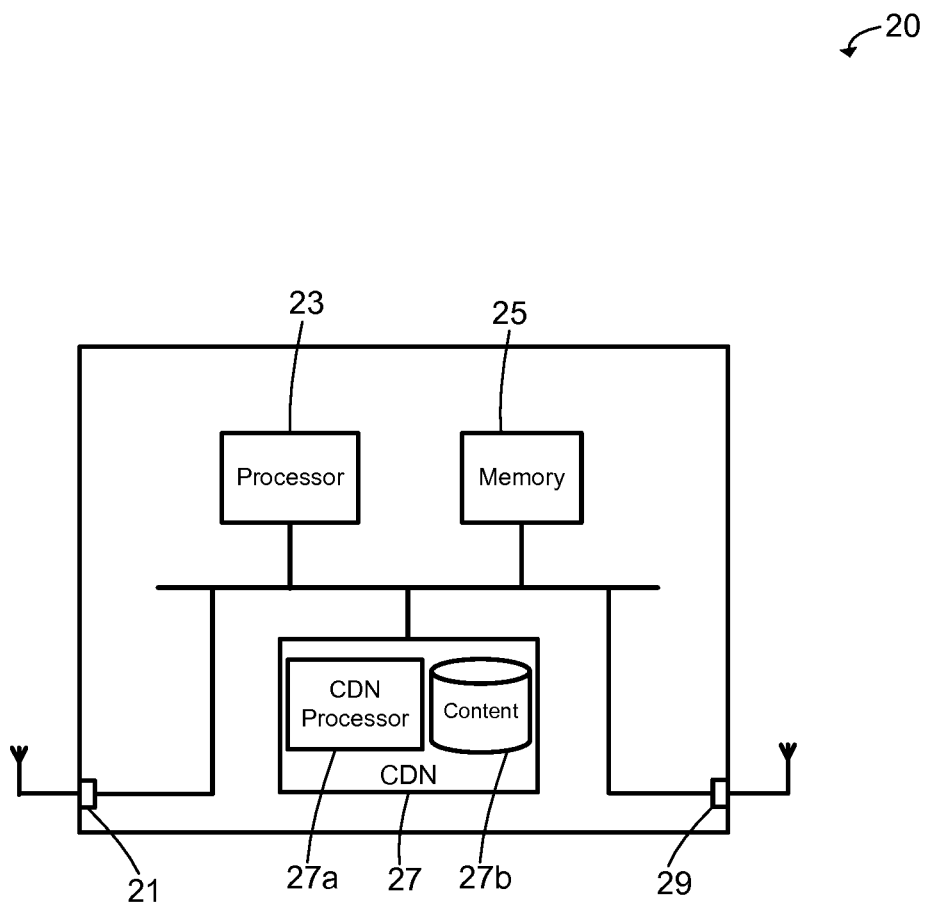
FIG. 2 is a schematic diagram of a relay node of the network of FIG. 1.
Figure 3:
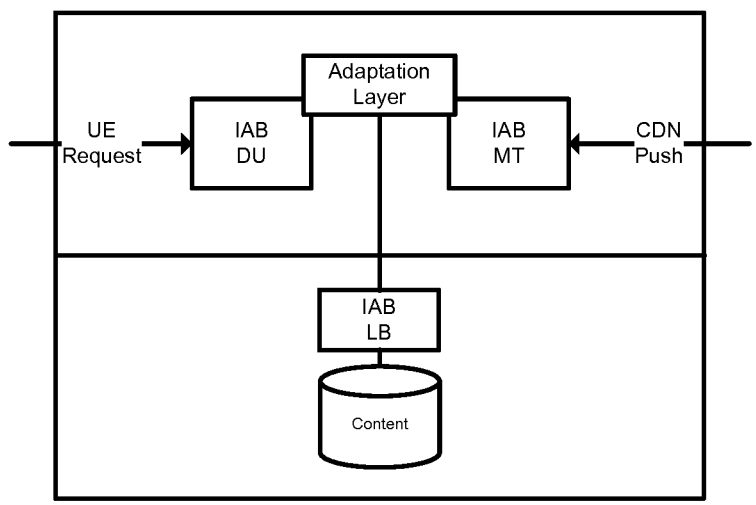
FIG. 3 is a further diagram of the relay node of FIG. 2.

The relay 20 is shown in more detail in FIGS. 2 and 3. As shown in FIG. 2, the relay 20 includes a first communications interface 21, a processor 23, memory 25 (including a Subscriber Identity Module, SIM), an access CDN server 27 (including an access CDN processor 27a and an access content store 27b), and a second communications interface 29, all connected via a data bus. The access CDN server 27 operates to store and retrieve one or more content items in the access content store 27b, wherein each content item is associated with a content item identifier. The first communications interface 21 is an antenna configured for wireless communications with the UE 30. The second communications interface 29 is an antenna for a wireless backhaul connection towards the core network 40, which, in this embodiment, is via a donor connection to the base station 10. Accordingly, the relay 20 is a radio access node that supports both wireless access and wireless backhaul.

In this embodiment, the cellular telecommunications operates according to the $5^{th}$ Generation (5G) $3^{rd}$ Generation Partnership Project (3GPP) protocol. The relay 20 shall therefore be referred to as the Integrated Access Backhaul (IAB) node, and the base station 10 shall therefore be referred to as the IAB-donor.

FIG. 3 illustrates the functional elements of the IAB-node 20 implemented by its components. The IAB-node 20 implements an IAB Distributed Unit (DU) and IAB Mobile Termination (MT), which are discussed in 3GPP Technical Report (TR) 38.874, which form connections with the UE 30 and IAB-donor 10 respectively. The IAB-DU and IAB-MT cooperate to implement an adaptation layer for routing data packets between the IAB-DU and IAB-MT. Accordingly, any data packet received at the IAB-MT destined for the UE 30 will be routed (by the adaptation layer) to the IAB-DU and onwards to the UE 30. Similarly, any data packet received at the IAB-DU destined for the IAB-donor 10 or any node upstream of the IAB-donor 10 will be routed (by the adaptation layer) to the IAB-MT and onwards to the IAB-donor 10.

FIG. 3 also illustrates a connection between the adaptation layer and the IAB-node's access CDN server 27 via an IAB-Line Break (IAB-LB). The IAB-node's access CDN server 27 is addressable by a CDN identifier that is recognized by each node in the cellular telecommunications network 1 as uniquely identifying the IAB-node's CDN server 27. Accordingly, on receipt of a message from the UE 30 (via the first transceiver 21) or a message from the IAB-donor 10 (via the second transceiver 29) which includes the CDN identifier, the adaptation layer is configured to decode the message to retrieve the CDN identifier and process the CDN identifier to determine that the message relates to the IAB-node's access CDN server 27. This message may, for example, include a content transaction request such as a request to store a content item in the access content store 27b, or a request to retrieve a content item from the access content store 27b, of the IAB-node's access CDN server 27.

In this embodiment, the CDN identifier uses the same format as a UE identifier for identifying the UE 30. As this embodiment is based on the 5G cellular protocol, the CDN identifier and UE identifier are both the International Mobile Subscriber Identifier (IMSI). This will now be explained in more detail with reference to FIG. 4. The IMSI is composed of three parts: the Mobile Country Code (MCC) consisting of three digits and uniquely identifying the country of domicile of the mobile subscription; the Mobile Network Node (MNC) consisting of two or three digits and identifying the home network (i.e. the home Public Land Mobile Network, PLMN) of the mobile subscription; and the Mobile Subscriber Identification Number (MSIN) identifying the mobile subscription within the home network.

Figure 4:
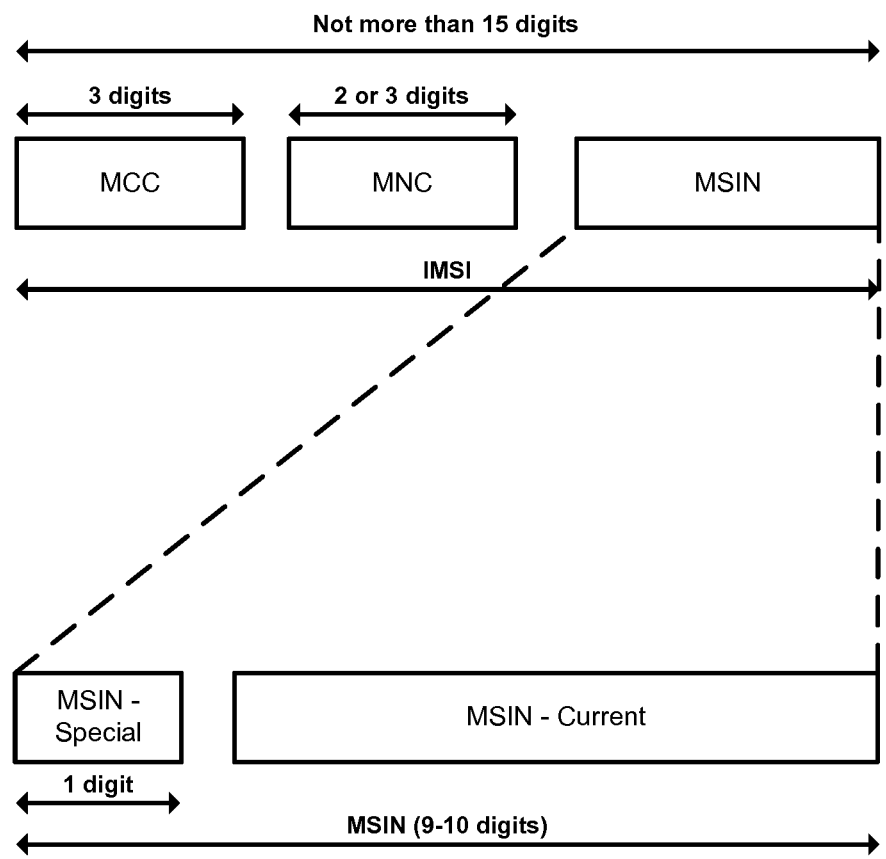
FIG. 4 is a diagram illustrating an International Mobile Subscriber Identifier.

FIG. 4 also illustrates the MSIN being composed of two parts: MSIN—Special and MSIN—Current. MSIN—Current includes the unique identifier value, whereas MSIN—Special is a single digit that is utilized in this embodiment to indicate whether the identifier is being used to identify a UE or a CDN. In this example, the MSIN-Special digit uses the value 0 to indicate that the IMSI relates to a UE and uses the value 1 to indicate that the IMSI relates to a CDN.

In this embodiment, the IAB-node's SIM (in memory 25) stores the IMSI of the IAB-node's access CDN server 27. The MSIN of this IMSI therefore includes an MSIN-Current part containing the identifier value which uniquely identifies the access CDN server 27 from any other node in the cellular network, and a MSIN-Special part having value 1 to indicate that the IMSI is being used to identify a CDN. Furthermore, the UE 30 includes a SIM storing the UE's IMSI, which includes an MSIN-Current part containing the identifier value which uniquely identifies the UE 30 from any other node in the cellular network 1, and a MSIN-Special part having value 0 to indicate that the IMSI is being used to identify a UE.

Turning back to FIG. 3, the IAB-node may therefore receive a message, at the IAB-DU or IAB-MT, which includes the IMSI of the access CDN server 27 as the destination of that message. The adaptation layer may then decode the MSIN-Special part of the IMSI to determine that the message is for a CDN, and decode the MSIN-Current to determine that the access CDN server 27 is the destination. In response, the adaptation layer forwards this message to the IAB-LB, which processes the message to determine the particular content transaction request (e.g. to identify a content item and to determine whether the transaction is to store or retrieve the content item).

By utilizing the identifier used by the cellular protocol to identify UEs to further identify CDNs provides several advantages to this embodiment of the invention. That is, any external node may address a wireless CDN in the cellular network using the same hardware that is used for any other communication according to that cellular protocol, and may further utilize the same standardized processes for data transfer and mobility. This reduces the capital cost of deploying CDNs (as they may utilize the IAB-node's hardware for communication), and improves the quality of experience as the IAB-node may benefit from all processes of the cellular protocol (e.g. handover, multi-hop, etc.) without having a tailored software upgrade.

Figure 5:
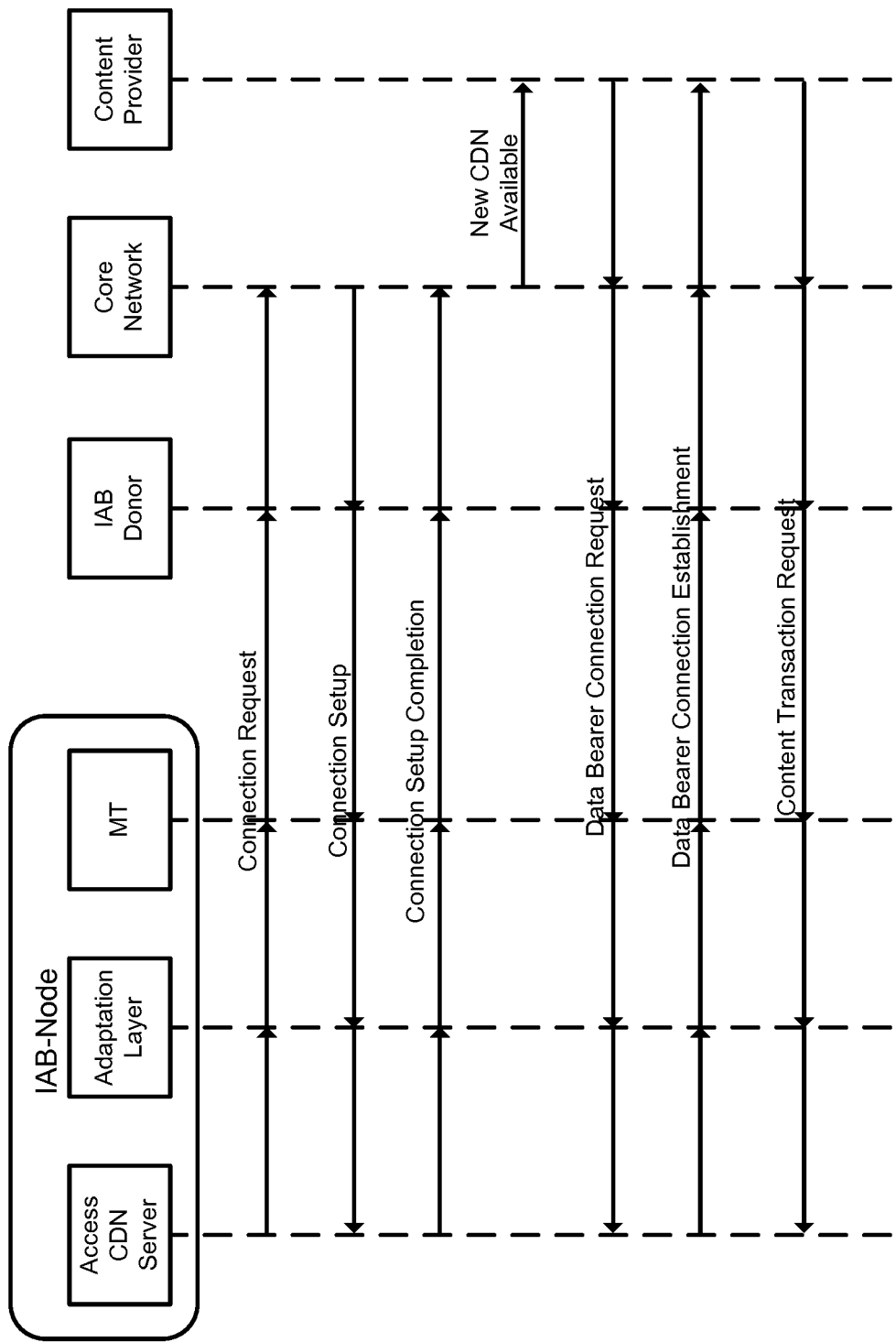
FIG. 5 is a call flow diagram illustrating a content provider storing a content item on the relay node of FIG. 2.

A first embodiment of a method of the present disclosure will now be described with reference to FIG. 5. In this first embodiment, the IAB-node's access CDN server 27 is first established on the cellular network 1 by sending a connection request message to the core network (e.g. the Access and Mobility Management Function, AMF). The core network and IAB-node's access CDN server then exchange connection setup messages, and the credentials of the IAB-node's access CDN server (including its IMSI) are recorded in the core network.

Following connection setup, the core network sends data on the IAB-node's access CDN server 27 to all content providers in the cellular network (and any known content providers in external networks that the cellular network has onward connections to). This data includes the IMSI of the IAB-node's access CDN server 27.

In this first embodiment, there is a determination by a content delivery protocol that a content item of the content provider should be stored in the IAB-node's access CDN server 27. This determination may be based on data indicating a high probability that the content item will be requested by users in the geographical region of the IAB-node 20, so that users in this geographical region retrieving the content item from the IAB-node's access CDN server 27 would experience improved quality of service (e.g. lower latency) compared to users in the same geographical region retrieving the content item from the core CDN server 50. Furthermore, retrieval from the access CDN server 27, instead of the core CDN server 50, would reduce utilization on any intermediate links between the IAB-node and the core CDN server.

Following this determination, the content provider sends a request message to the IAB-node's access CDN server 27 to establish a data bearer connection. As the IAB-node's access CDN server 27 is addressable as a UE (that is, using its IMSI), this may follow the same procedures for connection establishment as used in the cellular protocol for a UE.

Following establishment of the data bearer connection, the content provider sends the IAB-node's access CDN server 27 a content transaction request message. In this embodiment, the content transaction request includes: the CDN identifier uniquely identifying the access CDN server 27, a content item (in this example, an operating system update file), a content item identifier uniquely identifying the content item, and a content transaction indicator indicating that the content transaction is to store the content item.

The processor 23 (implementing adaptation layer processes) decodes the constituent parts of the content transaction request message, and, in response, initiates storage of the content item in the access content store 27b together with the content item identifier.

Figure 6:
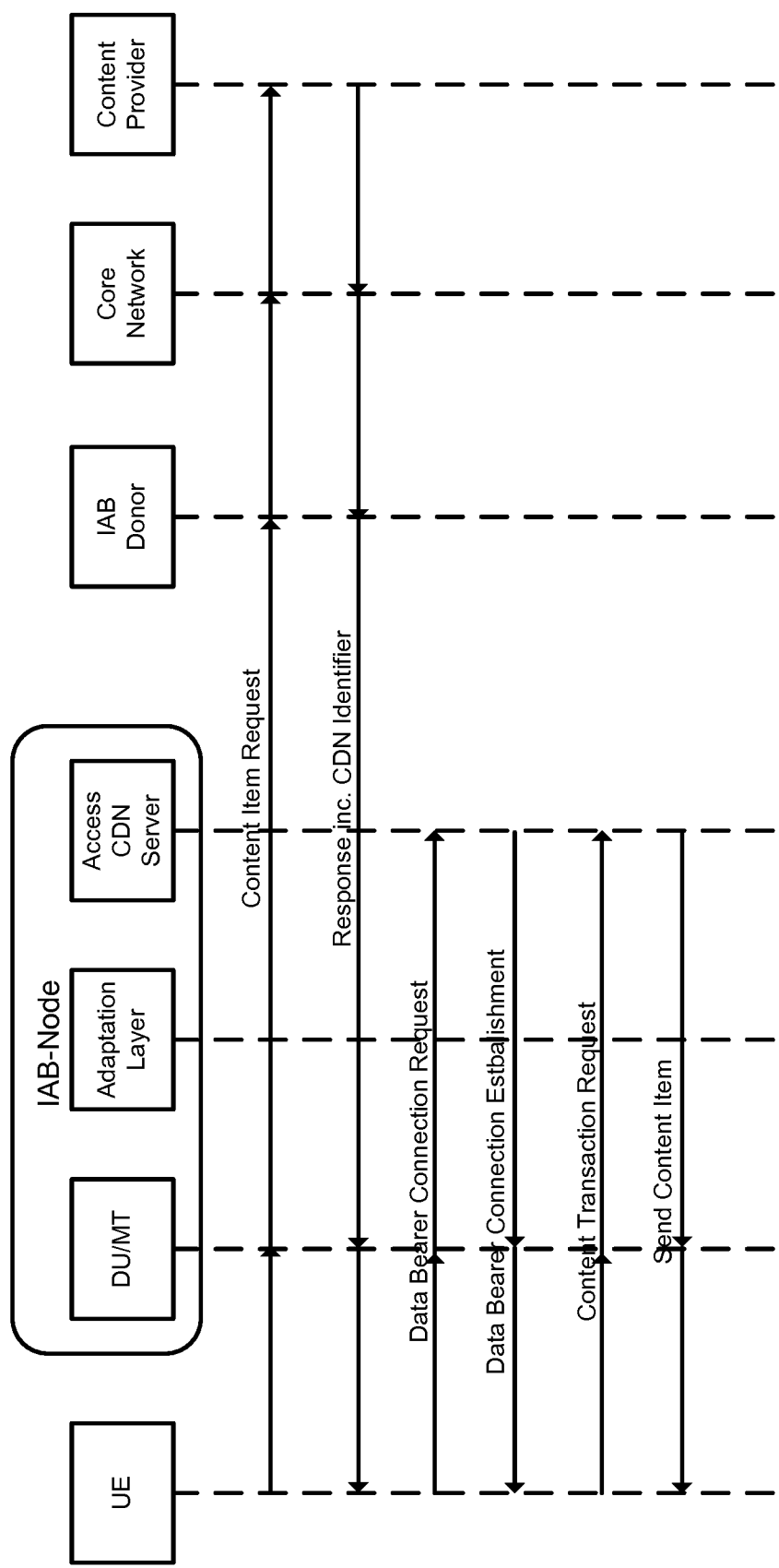
FIG. 6 is a call flow diagram illustrating a content provider retrieving a content item from the relay node of FIG. 2.

A second embodiment of a method of present disclosure will now be described with reference to FIG. 6. In this second embodiment, the UE 30 sends a request message to the content provider identifying a content item. The content provider responds to this request message by identifying the most suitable CDN server (either the core CDN server or access CDN server 27) for the UE to retrieve the content item from. This identification may include determining the quality of the connection between the UE and the core CDN server and of the connection between the UE and the access CDN server and/or by determining the geographical relationship between the UE and the core CDN server and between the UE and the access CDN server. In this example, the content provider determines that the UE should retrieve the content item from the IAB-node's access CDN server 27. Accordingly, the content provider's response to the request message includes the IMSI of the access CDN server 27.

The UE 30 then sends a request message to the IAB-node's access CDN server 27 to establish a data bearer connection (utilizing the access CDN server's IMSI). Again, as the IAB-node's access CDN server 27 is addressable as a UE (that is, using its IMSI), this may follow the same procedures for connection establishment as used in the cellular protocol for a UE. Following data bearer connection establishment, the UE 30 sends the IAB-node's access CDN server 27 a content transaction message. In this embodiment, the content transaction request includes: the CDN identifier uniquely identifying the access CDN server 27, a content item identifier uniquely identifying the content item, and a content transaction indicator indicating that the content transaction is to retrieve the content item.

The processor 23 (implementing adaptation layer processes) decodes the constituent parts of the content transaction message and, in response, initiates retrieval of the content item from the access content store 27b, and further initiates the transfer of the content item to the UE 30 via the first transceiver 21.

Figure 7:
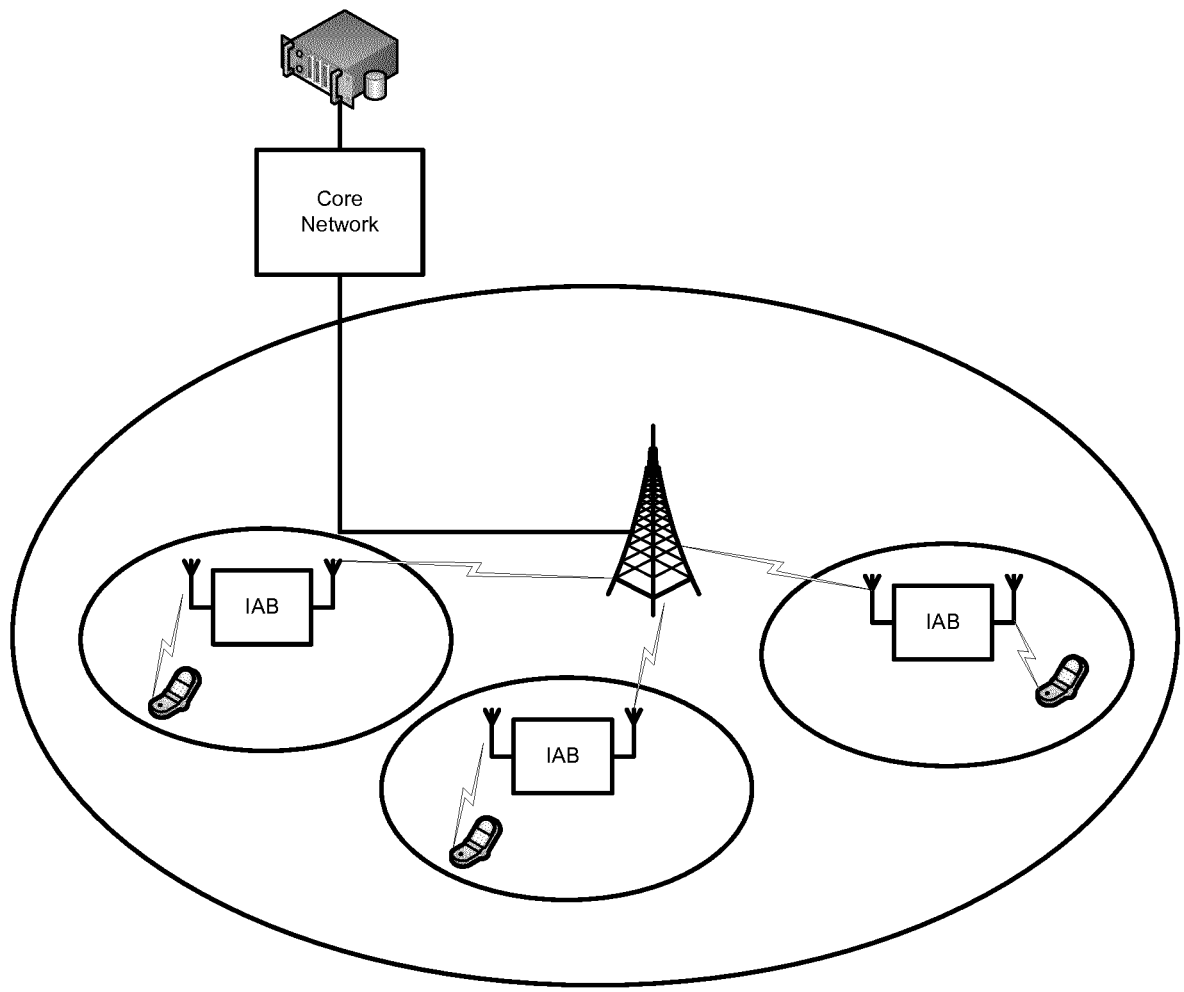
FIG. 7 is a schematic diagram of the network of FIG. 1 with a plurality of relay nodes.

The above first and second embodiments of methods of the present disclosure illustrate how the new CDN identifier may be used to store and retrieve content items in a CDN where the CDN has a wireless backhaul connection. However, as noted above, there are further benefits to using a CDN identifier that takes the same form as the UE identifier, such as being able to utilize other standardized processes in the cellular protocol. These include, for example, multicast over the backhaul connection between the IAB-donor and a plurality of IAB-nodes each having access CDN servers. FIG. 7 illustrates such an example in which the IAB-donor forms a donor connection to a first, second and third IAB-node, having a first, second and third access CDN server respectively. In this scenario, the IAB-donor may use multicasting over the backhaul connections between the IAB-donor with each of the first, second and third IAB-nodes to efficiently transfer the same content item to all IAB-nodes (that is, by using a common part of the radio spectrum to transfer the content item to all IAB-nodes). This contrasts to the prior art scenario in which the content item would be transferred over unicast between the IAB-donor and all IAB-nodes in which the content item is transferred using distinct parts of the radio spectrum.

In the above embodiments, the IAB-node 20 includes the access CDN server. However, the skilled person will understand that it is not essential for the IAB-node and access CDN server to be part of the same infrastructure. In an alternative configuration, the IAB-node and access CDN server may be separate entities configured to communicate with each other. Furthermore, it is non-essential that the access CDN server is associated with an IAB-node. Instead, the access CDN server could be associated with any other access node which has a backhaul connection which is at least partially wireless, such as a small cell base station.

In the above embodiments, the cellular network operates according to the 3GPP 5G cellular networking protocol and uses the IMSI as the UE and CDN identifier. However, this is non-essential. That is, other identifiers that are used to identify a user or UE (e.g. the International Mobile Equipment Identity, IMEI) could also be used. The skilled person will understand that these are permanent forms of UE identifier. Furthermore, the cellular network may operate according to any other protocol and the CDN identifier would then have the form defined in that protocol for identifying the UE.

Furthermore, in the above embodiments, the MSIN of the IMSI is adapted to indicate whether or not the IMSI is being used to identify a CDN or a UE. This is non-essential, but it is preferential as it increases the number of unique identifiers that may be used.

The skilled person will understand that any combination of features is possible within the scope of the disclosure, as claimed.

The invention claimed is:

1. A method of operating a network node in a cellular telecommunications network, the cellular telecommunications network including a User Equipment (UE) wherein the UE is identifiable in the cellular telecommunications network by an identifier having a form defined by a cellular telecommunications protocol, wherein the network node includes a content store, is one of a relay node and a small cell base station, and has a backhaul connection that is at least partially wireless, the method comprising:
receiving, at the network node, a content transaction request from an external node in the cellular telecommunications network over a wireless connection, the content transaction request including a content store identifier for identifying the content store and further including a content identifier for identifying a content item, wherein the content store identifier has the form defined by the cellular telecommunications protocol for permanently identifying the UE; and
processing, at the network node, the content transaction request to perform a transaction with the identified content item in the identified content store.

2. The method as claimed in claim 1, wherein the cellular telecommunications protocol is a 3rd Generation Partnership Project (3GPP) protocol.

3. The method as claimed in claim 2, wherein the identifier is an International Mobile Subscriber Identifier (IMSI).

4. The method as claimed in claim 1, wherein the content transaction request from the external node is to store the content item, and performing the transaction with the content store includes storing the content item in the content store together with the content identifier.

5. The method as claimed in claim 4, wherein the content transaction request is of a multicast/broadcast message.

6. The method as claimed in claim 1, wherein the content transaction request from the external node is to retrieve the content item, and performing the transaction with the content store includes:
identifying the content item based on the content identifier; and
retrieving the content item from the content store.

7. A non-transitory computer-readable storage medium storing a computer program product comprising instructions which, when the computer program product is executed by a computer, cause the computer to carry out the method of claim 1.

8. A system comprising at least one processor and memory configured to carry out the method of claim 1.

9. A network node in a cellular telecommunications network, wherein the cellular telecommunications network further comprises a user equipment (UE), wherein the UE is identifiable in the cellular telecommunications network by a permanent identifier having a form defined by a cellular telecommunications protocol, the network node being one of a relay node and a small cell base station and having a backhaul connection that is at least partially wireless, the network node comprising:
a content store;
a transceiver configured to receive a content transaction request from another node in the cellular telecommunications network over a wireless connection, the content transaction request including a content store identifier for identifying the content store and further including a content identifier for identifying a content item, wherein the content store identifier has the form defined by the cellular telecommunications protocol for permanently identifying the UE; and
a processor configured to process the content transaction request to perform a transaction with the identified content item in the identified content store.

10. The network node as claimed in claim 9, wherein the cellular telecommunications protocol is a 3rd Generation Partnership Project (3GPP) protocol.

11. The network node as claimed in claim 10, wherein the identifier is an International Mobile Subscriber Identifier (IMSI).

12. The network node as claimed in claim 9, wherein the content transaction request from the another node is to store the content item, and performing the transaction with the content store includes storing the content item in the content store together with the content identifier.

13. The network node as claimed in claim 12, wherein the content transaction request is of a multicast/broadcast message.

14. The network node as claimed in claim 9, wherein the content transaction request from the another node is to retrieve the content item, and performing the transaction with the content store includes:
identifying the content item based on the content identifier; and
retrieving the content item from the content store.

15. The network node as claimed in claim 9, being one of a group consisting of: a relay node, and a small cell base station.

* * * * *